United States Patent
Goodell

(10) Patent No.: US 6,220,276 B1
(45) Date of Patent: Apr. 24, 2001

(54) TRAILER CONTROL VALVE WITH VARIABLE PORT ORIENTATION

(75) Inventor: David J. Goodell, Beaverton, OR (US)

(73) Assignee: Honeywell Commercial Vehicle Systems Co., Elyria, OH (US)

( * ) Notice: Subject to any disclaimer, the term of this patent is extended or adjusted under 35 U.S.C. 154(b) by 0 days.

(21) Appl. No.: 09/488,246

(22) Filed: Jan. 20, 2000

(51) Int. Cl.[7] .................................................. F16K 31/524

(52) U.S. Cl. .................. 137/270; 137/636.1; 137/636.2; 251/251

(58) Field of Search ..................................... 137/270, 269, 137/271, 636.1, 636.2; 251/251, 280, 231, 235

(56) References Cited

U.S. PATENT DOCUMENTS

| | | | |
|---|---|---|---|
| 3,677,281 | * 7/1972 | Tennis | 137/270 |
| 3,882,883 | * 5/1975 | Droegemueller | 137/270 |
| 4,098,286 | * 7/1978 | Prime | 137/270 |
| 4,131,126 | * 12/1978 | Chromik | 137/270 |

* cited by examiner

*Primary Examiner*—Kevin Lee

(57) ABSTRACT

A control valve assembly for a heavy vehicle provides a symmetrical design that minimizes costs and provides a universal adaptation to a number of OEM configurations. The valve assembly can be used with different design platforms since symmetrical surfaces allow the valve body to be oriented as desired. Symmetrical mounting openings, alternate actuating lever mounting arrangements, and preselected angled orientation of the valve ports provide for the use of low-cost fittings that are useful in a wide variety of OEM configurations.

17 Claims, 2 Drawing Sheets

TRAILER CONTROL VALVE WITH VARIABLE PORT ORIENTATION

BACKGROUND OF THE INVENTION

1. Field of the Invention

This invention relates to a control valve body assembly, and more particularly, to a trailer control valve body assembly finding application in a brake system used in different original equipment manufacturer's heavy vehicles.

2. Discussion of the Art

In trailer brake systems, it is conventional to mount a control valve assembly on the dashboard of the tractor compartment. For example, a common form of valve actuator is a pivoting lever used to control the trailer brakes. The lever is rotated about a horizontal axis, i.e., in a vertical direction, to selectively apply and release the trailer brakes as desired by the operator.

The trailer control valve assembly is intended for use with a number of different tractor or vehicle systems. For example, a number of original equipment manufacturers (OEMs) build vehicles that use pneumatic brake systems but have varying styles or design platforms. One manufacturer may locate the air lines or plumbing on the left side of the vehicle compartment while another manufacturer mounts the air lines on the right, above, or below the dashboard mounting opening. Thus, although various dashboard mounted control valve assemblies are readily accepted, the brake system must be easily adapted to various fitting locations, orientations, etc. As such, brake manufacturers such as the present applicant maintain an inventory of different types or styles of connectors, fittings, and the like so that the control valve assembly is easily connected to the OEMs plumbing arrangement. If the air lines are fed from above, below, left, or right of the dashboard mounting opening, it may be necessary to employ straight fittings with one manufacturer and right angle fittings extending in different directions to interconnect the air lines with the port extending from the valve body. Likewise, different component options mounted behind the dashboard may necessitate a certain orientation of the ports even in the same vehicle model. Alternatively, unique valve components may be required to interconnect the control valve body to the remainder of the air line system. Thus, even though the air brake system is easily accommodated into the OEM equipment, a slight increase in cost is associated with these special types of fittings or more specialized valve components. A need exists to provide a more universal arrangement for various or different vehicle platforms while addressing the need to improve assembly and reduce manufacturing costs.

SUMMARY OF THE INVENTION

The present invention provides a control valve assembly that uses low cost valve components and provides greater flexibility without using adapter valve components.

An exemplary embodiment of the control valve assembly includes a valve body having a longitudinal axis and symmetrically dimensioned surfaces disposed thereabout. Plural ports extend from the valve body at an angle between zero (0°) and ninety (90°) degrees relative to the longitudinal axis of the body, and preferably from thirty degrees (30°) to forty five degrees (45°). An actuator extends from the body for selectively operating the control valve assembly.

The symmetrically, dimensioned surfaces permit selective orientation of the valve body relative to a control panel of the heavy vehicle.

The actuator can be mounted in various orientations relative to the valve body so that if the valve body is disposed in a different orientation, the actuating lever operation remains unchanged to the end user.

A primary benefit of the invention is the flexibility of the control valve assembly for use on different vehicle platforms.

Another benefit of the invention resides in the elimination of special fittings or unique valve components.

Still another benefit of the invention resides in the low cost of installation.

Still other advantages and benefits of the invention will become apparent to others upon a reading and understanding of the following detailed description.

DETAILED DESCRIPTION OF THE PREFERRED EMBODIMENTS

Figure 1:
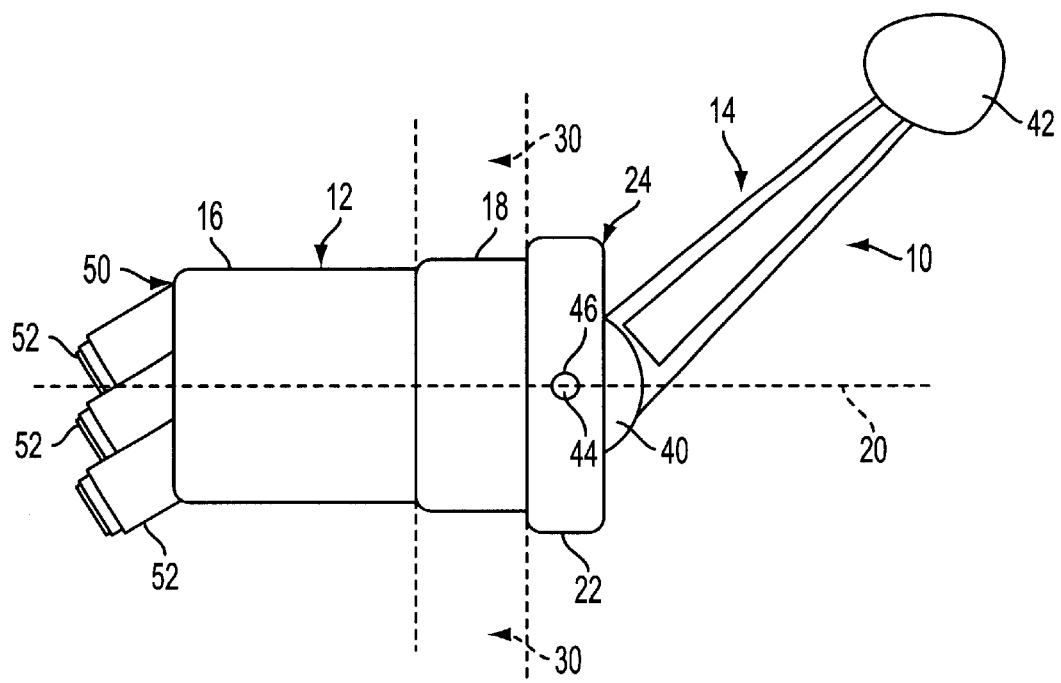
FIG. 1 is an elevational view of an exemplary embodiment with the ports directed downwardly.

A trailer control valve body assembly 10 is shown in FIGS. 1–4. It includes a valve body 12 and an actuator 14. The valve body has a symmetrical configuration. For example, in the preferred arrangement the valve body has cylindrical portions 16, 18 which allow the valve body to be received in any circular opening centered about the longitudinal axis 20. Alternatively, the body can include symmetrical planar surfaces, such as four equal sides, that allow the body to be oriented in ninety degree (90°) increments. Still other symmetrical relationships could be used without departing from the scope and intent of the present invention.

An enlarged shoulder 22 is provided at a first end 24 of the valve body. The shoulder is dimensioned for flush receipt in a control panel 30, such as a dashboard, control panel, or operator console in a tractor cab. The control panel has an opening adapted to receive the shoulder 22 in flush relation with the panel.

Figure 3:
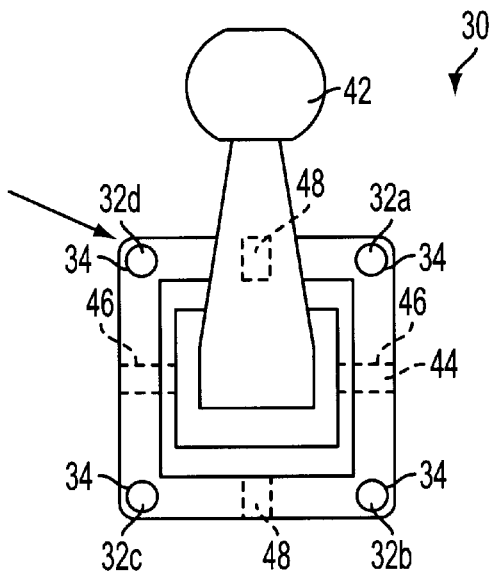
FIG. 3 is an end view taken generally from the right-hand end of FIG. 1.
Figure 4:
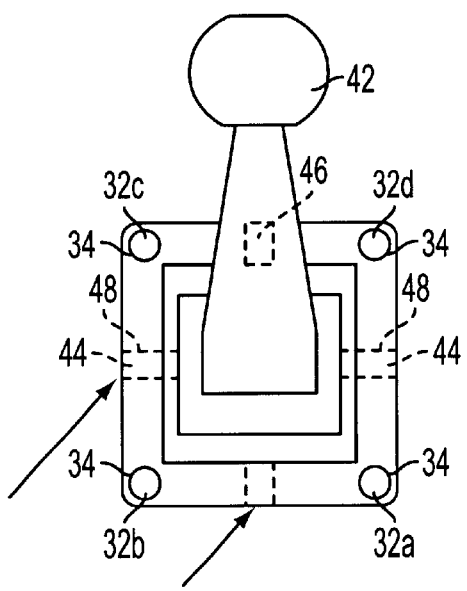
FIG. 4 is an end view taken generally from the right-hand end of FIG. 1 after the valve body has been rotated.

Mounting openings 32 (FIGS. 3 and 4) are symmetrically arranged in the shoulder and preferably extend through the shoulder in a direction generally parallel to the longitudinal axis. The openings receive fasteners 34 and are preferably equi-spaced and symmetrically arranged in the shoulder 22 so that various orientations of the valve body relative to the panel can be easily accommodated. For example, a comparison of FIGS. 3 and 4 illustrate the valve body has been rotated ninety degrees (90°) relative to the operator panel 30. Note that the openings 32a–32d are indexed one position in a clockwise direction in FIG. 4 relative to the position of the openings in FIG. 3. As previously indicated, this is possible because of the symmetrical arrangement of the remainder of the valve body, i.e., the surfaces 16, 18.

Also secured to the first end 24 of the valve body is the actuating member 14. In the preferred arrangement, the actuating assembly includes a lever handle and actuation cam 40. The cam cooperates with an internal piston of the valve to operate the trailer brakes and as will be appreciated, the cam and internal piston are preferably of symmetrical design to allow the body to be rotated without adversely impacting on the valve operation. The lever includes an ergonomic handle or knob 42 that is easily grasped by the operator. At the opposite end, the lever and cam is mounted for rotation about a horizontal axis defined by pin 44. The pin 44 is received in mounting openings 46 disposed in the shoulder 18 and that are oriented generally perpendicular to the longitudinal axis 20. It will be appreciated that the openings 46 are exclusively used to mount the lever and actuation cam for rotation about a horizontal axis defined by the pin 44 in the embodiment of FIG. 3. When the body has been rotated through 90° or 270°, similar mounting openings 48 are then used to mount the pin 44 and maintain operation of the lever and cam about a horizontal axis. In this manner, the same, consistent operation of the control valve is presented to the operator, i.e., in the preferred arrangement rotation of the actuation lever about a horizontal axis, to selectively actuate and release the valve.

Figure 2:
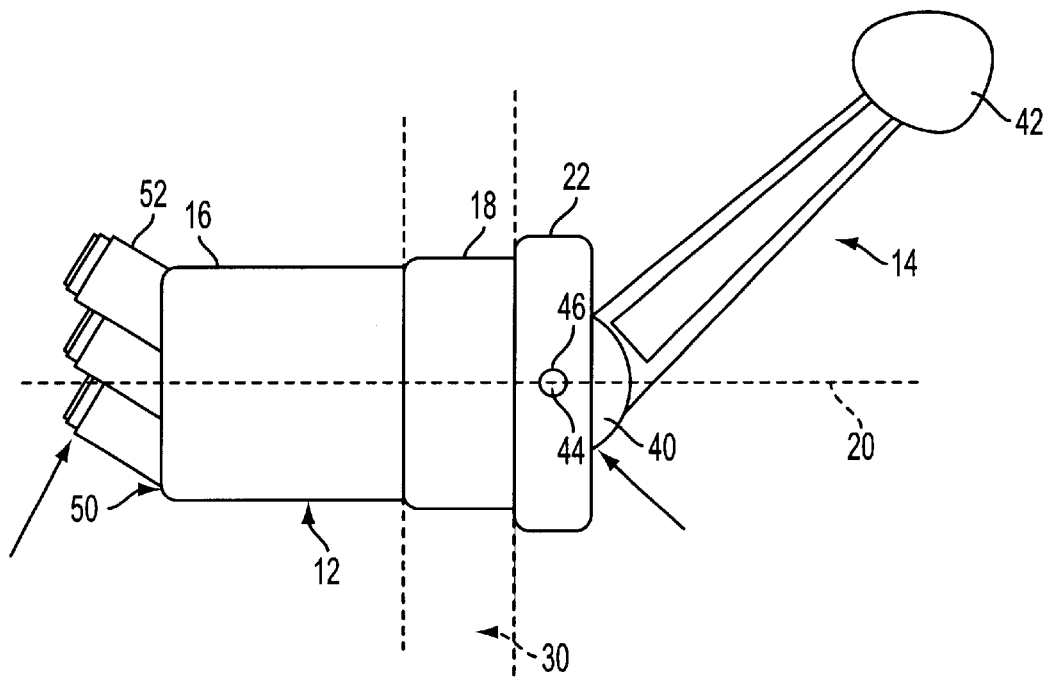
FIG. 2 is an elevational view similar to FIG. 1 with the ports directed upwardly.

Disposed inboard of the control panel at a second end 50 of the valve body are ports 52. The ports are all preferably oriented at an angle relative to the longitudinal axis of the valve body. Due to the angular orientation, and the symmetry of the valve body outer surfaces, as well as the symmetry of the mounting holes, the valve body assembly can be easily repositioned to orient the valve ports in a different direction. For example, in FIG. 1 the ports are generally disposed downwardly relative to the longitudinal axis 18. FIG. 2, on the other hand, illustrates the ports oriented in an upward conformation. These are just two examples of alternative orientations of the valve body, it being understood by one skilled in the art that still other orientations can be used without departing from the scope and intent of the present invention.

By providing a preselected angular orientation of the ports relative to the valve body, more expensive fittings or connectors are eliminated from use in different OEM brake systems. By way of example, in the prior arrangement it was necessary to use a right angle fitting to connect the axially directed port with a terminal end of an air line disposed in a ninety degree relation relative to the valve body axis. The angled ports of the present invention provide a substitute portion of this angle and the installer can complete the remainder of the angle by bending or turning the plumbing or air lines. Thus, a straight connector can be used since the angled ports in the valve body already significantly address the need to complete an angled connection in the OEM system. If it is necessary to direct the lines downwardly, then the orientation, for example, of FIG. 1 is used. On the other hand, if the air lines are disposed at a location above the body, then the orientation of FIG. 2 is used. It will be appreciated that left and right orientations are also conveniently accommodated with the symmetrical mounting surfaces of the control valve body.

By using the predetermined angled orientation of the ports in the valve body, less expensive straight fittings can be used. There is some flexibility available in the plumbing lines themselves so that it is no longer necessary to use special, more expensive right-angled fittings, connectors, or adaptors. By way of example, the ports are illustrated as being angularly offset from thirty degrees (30°) and thirty five degrees (35°) relative to the longitudinal axis of the valve body. It is conventional in the industry to use forty five (45°) or ninety degree (90°) adaptors to interconnect the ports of the valve body with the existing plumbing system. Thus, the angle is easily achieved by using a straight connector and a small degree of bend or curve to the remainder of the air line.

FIGS. 1 and 2 illustrate that the same mounting openings 46 are provided to maintain the desired orientation of the actuating lever relative to the dashboard 30. The ports 52, on the other hand, are reversed by one hundred eighty degrees (180°). This allows the system to be adapted to downward or upward configurations without any loss of function, and more importantly, without any disruption to the standard operating configuration for the vehicle operator. A common use of this type of valve is to operate a trailer control brake valve. Typically, with the actuating lever in the upper position as shown in the drawings, the trailer brakes are in a release position. By pulling downwardly on the knob 42, the lever and cam rotate about the pin 44 and actuate or apply the brakes. Of course, other actuation arrangements can be used and still advantageously employ the symmetrical features and variable port orientation concept of the present invention.

The invention has been described with reference to the preferred embodiment. Modifications and alterations will occur to others upon a reading and understanding of the specification. The invention is intended to include all such modifications and alterations in so far as they fall within the scope of the appended claims or the equivalents thereof.

Having thus described the invention, it is now claimed:

1. A control valve assembly for a heavy vehicle comprising:
   a valve body having a longitudinal axis and symmetrically dimensioned surfaces about the axis for selected oriented receipt in a control panel;
   a plurality of ports extending from the valve body, the ports disposed at an angle between zero (0°) and ninety (90°) degrees relative to the longitudinal axis of the valve body and adapted to receive straight fittings; and
   an actuator extending from the body for selectively operating the control valve assembly.

2. The control valve assembly of claim 1 wherein the actuator is a lever and cam assembly pivotally mounted to the valve body.

3. The control valve assembly of claim 2 further comprising a pin received in the valve body about which the actuator pivots.

4. The control valve assembly of claim 3 wherein the valve body includes pin mounting openings that receive the pin therein.

5. The control valve assembly of claim 4 wherein the body includes additional pin mounting openings that receive the pin therein depending on the selected orientation of the valve body.

6. The control valve assembly of claim 5 wherein the pin mounting openings and additional pin mounting openings are symmetrically located on the valve body.

7. The control valve assembly of claim 1 wherein the valve body includes means for mounting the valve body to an associated operator panel, the mounting means symmetrically spaced on the valve body to permit alternative orientations of the valve body.

8. The control valve assembly of claim 1 wherein the ports are disposed at an angle from thirty degrees (30°) to forty-five degrees (45°) relative to the longitudinal axis.

9. A control valve assembly for a heavy vehicle comprising:
   a valve body having external surfaces symmetrically disposed about a longitudinal axis, the valve body adapted for selective oriented receipt in a control panel;
   a plurality of ports extending from the valve body, the ports disposed at an angle between zero (0°) and ninety (90°) degrees relative to the longitudinal axis of the valve body and adapted to receive straight fittings;

mounting members symmetrically arranged on the valve body for selectively rotating and mounting the valve body to the control panel; and an actuator extending from the body for selectively operating the control valve assembly.

10. The control valve assembly of claim 9 wherein the actuator is symmetrically mounted to the valve body.

11. The control valve assembly of claim 10 wherein the actuator is a lever and cam assembly pivotally mounted to the valve body.

12. The control valve assembly of claim 11 further comprising a pin received in the valve body about which the actuator pivots.

13. The control valve assembly of claim 12 wherein the valve body includes pin mounting openings that receive the pin therein.

14. The control valve assembly of claim 13 wherein the body includes additional pin mounting openings that receive the pin therein depending on the selected orientation of the valve body.

15. The control valve assembly of claim 14 wherein the pin mounting openings and additional pin mounting openings are symmetrically located on the valve body.

16. The control valve assembly of claim 9 wherein the valve body includes means for mounting the valve body to an associated operator panel, the mounting means symmetrically spaced on the valve body to permit alternative orientations of the valve body.

17. The control valve assembly of claim 9 wherein the ports are disposed at an angle from thirty degrees (30°) to forty-five degrees (45°) relative to the longitudinal axis.

* * * * *